: 2,976,260
Patented Mar. 21, 1961

2,976,260

POLY-α-OLEFINS CONTAINING CERTAIN 4-ALKOXY-2-HYDROXYBENZOPHENONES AND ALKYLENE-BIS-PHENOLS

Gordon C. Newland and John W. Tamblyn, Kingsport, Tenn., assignors to Eastman Kodak Company, Rochester, N.Y., a corporation of New Jersey No Drawing. Filed Nov. 28, 1958, Ser. No. 776,697

11 Claims. (Cl. 260—45.95)

This invention relates to the stabilization of poly-α-olefin compositions. Preferred embodiments of the invention relate to the stabilization of polyethylene and polypropylene compositions against deterioration resulting from exposure to sunlight or ultraviolet light with novel synergistic stabilizer combinations.

Poly-α-olefins such as polyethylene, polypropylene and the like are subject to photo-oxidation when exposed to sunlight. This oxidation is characterized in its earlier stages by the breaking of the polymer chain and the formation of carbonyl groups. As the oxidation continues, the polymer cracks and loses tensile strength to the point of mechanical failure. A number of so-called ultraviolet inhibitors are known which inhibit the photodegradation of many polymers, resins or plastics. However, many effective stabilizers for halogen-containing polymers, for example, such as polyvinyl chloride, polyvinylidene chloride and the like are not effective stabilizers in poly-α-olefins as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins because of the inherently different nature of poly-α-olefins. Also, many stabilizers are compatible with several different polymer, resin or plastic materials but yet are incompatible with poly-α-olefins. For example, 2,4-dihydroxybenzophenone, a well-known ultraviolet inhibitor, exudes from polyethylene films soon after being incorporated therein. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to be synergistic stabilizers for poly-α-olefin compositions short of actually testing the combination, even though the individual components comprising the combination may be well-known stabilizers for various polymers, resins or plastics, including poly-α-olefin compositions.

Apart from the fact that it is an unexpected scientific discovery when two stabilizers are found that will synergize with each other in poly-α-olefin compositions, there are certain practical advantages that often times accompany the use of such a combination of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it would be desirable to be able to substitute the cheaper stabilizer for a portion of the more expensive stabilizer, and still be able to obtain good stabilization through the synergism of the stabilizer combination. In addition, one of the stabilizers of a combination that synergizes with another stabilizer to produce improved resistance to deterioration from ultraviolet light might also serve as an effective stabilizer against odor formation, discoloration or other degradation due to high temperature processing methods or to uses of poly-α-olefin compositions at high temperatures. Thus, it is highly desirable in the poly-α-olefin art to have available synergistic combinations of two or more stabilizers.

It is an object of this invention to provide new synergistic combinations of stabilizers for poly-α-olefin compositions.

It is another object of this invention to provide novel polyethylene and polypropylene compositions containing synergistic combinations of compounds that improve the stability of the polyethylene and polypropylene compositions against deterioration resulting from exposure to sunlight or ultraviolet light.

It is also an object of this invention to provide novel poly-α-olefin compositions of improved stability in thin film form.

Other objects of the invention will be apparent from the description and claims that follow.

The present invention comprises poly-α-olefin compositions having incorporated therein a synergistic stabilizer combination comprising (1) a 4-higher alkoxy-2-hydroxybenzophenone, and (2) an alkylene-bis-phenol of the group consisting of 2,2'-methylenebis[4-methyl-6-(1-methylcyclohexyl)phenol] and 4,4'-ethylenedioxybis(2-tert. butylphenol).

The 4-higher alkoxy-2-hydroxybenzophenone component of the present combination has an alkoxy group, —OR, wherein the R is an alkyl radical having 12 to 14 carbon atoms. Suitable 4-alkoxy-2-hydroxybenzophenone compounds that can be utilized are 4-dodecyloxy-2-hydroxybenzophenone, 4-tridecyloxy-2-hydroxybenzophenone and 4-tetradecyloxy-2-hydroxybenzophenone. Such compounds are described in Lappin and Tamblyn application U.S. Serial No. 694,906 filed November 7, 1957 now U.S. Patent No. 2,861,053 as effective stabilizers in poly-α-olefins against deterioration from ultraviolet light.

When combined with the particular alkylene-bis-phenols, 2,2'-methylenebis[4-methyl-6-(1-methylcyclohexyl)phenol] or 4,4'-ethylenedioxybis(2-tert. butyl phenol), the described 4-alkoxy-2-hydroxybenzophenones produce a stabilizing effect in poly-alpha-olefins that is greater than the additive or aggregative stabilizing effect of these individual stabilizers. Such combinations are generally referred to as synergistic combinations.

The combination of the subject 4-alkoxy-2-hydroxybenzophenones and alkylene-bis-phenols can be used to stabilize a wide variety of poly-alpha-olefin compositions against deterioration resulting from exposure to ultraviolet light. Any of the normally solid polymers of alpha-monoolefinic aliphatic hydrocarbons containing 2 to 10 carbon atoms can be stabilized in accordance with the invention. The subject stabilizer combination is preferably used in polyethylene and polypropylene, and particularly polyethylene, although such poly-alpha-olefins as poly 4-methylpentene-1, poly 3-methylbutene-1, poly 3,3-dimethyl-butene-1, poly pentene-1, and the like are included in the invention. Both the so-called "low density" and "high density" poly-alpha-olefin compositions can be stabilized in accordance with the invention. Reference is made to Fawcett et al. U.S. Patent No. 2,153,553 granted April 11, 1939, and to applications Coover U.S. Serial No. 559,536 filed January 17, 1956, now abandoned, and Coover et al. U.S. Serial No. 724,904 filed March 31, 1958, with regard to the preparation of various poly-alpha-olefin compositions that can be stabilized against ultraviolet deterioration with the subject stabilizer combination. The subject stabilizer combination can be used as an ultraviolet inhibitor for the more common solid resinous poly-alpha-olefin compositions having average molecular weights of at least 15,000 and more usually at least 20,000, as well as the so-called poly-α-olefin waxes having lower molecular weights, usually 3,000–12,000.

The amount of the combination of the subject 4-alkoxy-2-hydroxybenzophenones and alkylene-bis-phenols employed in poly-α-olefin compositions in accordance with the invention can be widely varied, the stabilizing amount of this combination usually varying with the particular use to which the poly-α-olefin is to be put. Concentrations of the combination of at least .001% are used, with concentrations of .001% to 10% being generally used, and with concentrations of .005% to 5% being preferably used, the concentration being based on the weight of the poly-α-olefin. The weight ratios of the stabilizers comprising the subject synergistic combination likewise can be varied. We prefer to utilize the combination of the subject stabilizers at weight ratios of alkylene-bis-phenol to 4-alkoxy-2-hydroxybenzophenone ranging from 1/30 to 30/1, and preferably 1/10 to 10/1.

The stabilizer combinations of the invention can be incorporated or blended into poly-α-olefin compositions by any of the conventional methods used for blending such materials into resins or plastics. Typical of such methods that can be suitably employed include milling on heated rolls, deposition from solvents, and dry-blending. The stabilizers of the invention can be incorporated separately or together into the poly-α-olefin composition.

The stabilizer combinations of the present invention lend to poly-α-olefin compositions improved stability, and more specifically, improved stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded, rolled or molded into sheets, rods, tubes, piping, filaments and other shaped articles, including the widely used films of the polymer about .5 to 100 mils in thickness. The present compositions can be used for coating paper, wire, metal foil, glass fiber fabrics, synthetic and natural textiles and other such materials. Likewise, small amounts of other additives such as other polymers, resins or plastics, as well as other stabilizers or inhibitors, that are commonly added to poly-α-olefins for specific uses are not deleterious to the effectiveness of the present synergistic combination.

The invention is illustrated by the following examples of preferred embodiments thereof.

EXAMPLE 1

Polyethylene samples containing .5% by weight of 4,4'-ethylenedioxybis(2-tert.butyl phenol) plus 1% by weight of 4-tetradecyloxy-2-hydroxybenzophenone, and .5% by weight of 2,2'-methylenebis[4-methyl-6-(1-methylcyclohexyl)phenol] plus 1% by weight of 4-tetradecyloxy-2-hydroxybenzophenone, as well as these three stabilizers individually and a control containing no stabilizer additive for comparative purposes, were subjected to an outdoor weathering test. The various additives were incorporated into polyethylene having an average weight of about 30,000 and a density of 0.918 by milling on heated rollers in accordance with usual practice. Thereafter the polyethylene was compression molded into films about 60 mils in thickness. Samples of the resulting films containing the various additives and the control sample containing no additive were exposed to outdoor weathering on a rack facing south at an angle with the horizontal of 36.5° at Kingsport, Tennessee. The progress of the deterioration due to the exposure of the various samples was followed by determining the carbonyl formulation in the samples as measured by infrared absorption in the 5.82 μ region. The detection of carbonyl increase in a poly-α-olefin polymer gives an early and reliable indication of the breaking down of the polymer. Reference is made to the following two references concerning the determination of the carbonyl content by infrared measurement: Rugg, Smith and Bacon, J. Polymer Sci., 13, 535(1954), and Cross, Richards and Willis, Discussions Faraday Soc., No. 9, 235(1950). The time in months required for the formation of 10 arbitrary units of carbonyl, enough to cause substantial deterioration in the electrical properties of the poly-α-olefin composition, were recorded and are summarized in the table below.

Table

| Additive | Exposure Time in Months to Produce 10 Units of Carbonyl |
|---|---|
| (1) None | 1 |
| (2) .5% 2,2'-Methylenebis[4-methyl-6-(1-methylcyclohexyl)phenol] | 2 |
| (3) .5% 4,4'-Ethylenedioxybis(2-tert. butyl phenol) | 2 |
| (4) 1% 4-Tetradecyloxy-2-hydroxybenzophenone | 12 |
| (5) .5% 2,2'-Methylenebis[4-methyl-6-(1-methylcyclohexyl)phenol]+1% 4-Tetradecyloxy-2-hydroxybenzophenone | >25 |
| (6) .5% 4,4'-Ethylenedioxybis(2-tert.butyl phenol)+1% 4-Tetradecyloxy-2-hydroxybenzophenone | 26 |

As can be observed from the data set out in the table, the combinations of 2,2'-methylene bis[4-methyl-6-(1-methylcyclohexyl)phenol] or 4,4'-ethylenedioxybis(2-tert.butyl phenol) and 4-tetradecyloxy-2-hydroxybenzophenone are stabilizer combinations that have stabilizing effects that are greater than the additive or aggregative effect of the individual stabilizers comprising these combinations. Similar synergism results when 1% by weight of 4-dodecyloxy-2-hydroxybenzophenone is substituted for the 4-tetradecyloxy-2-hydroxybenzophenone in combination with .5% by weight of 2,2'-methylenebis[4-methyl-6-(1-methylcyclohexyl)phenol] or .5% by weight of 4,4-ethylenedioxybis(2-tert.butyl phenol) in the polyethylene.

EXAMPLE 2

Polypropylene samples having an average molecular weight of about 110,000 and a density of 0.917 containing .5% by weight of 2,2'-methylenebis[4-methyl-6-(1-methylcyclohexyl)phenol] or .5% by weight of 4,4'-ethylenedioxybis(2-tert.butyl phenol) in combination with 1% by weight of 4-dodecyloxy-2-hydroxybenzophenone or 1% by weight of 4-tetradecyloxy-2-hydroxybenzophenone, when prepared in test samples and tested as described in Example 1, also show a synergistic effect in stabilizing the polypropylene against deterioration resulting from exposure to ultraviolet light.

The present invention thus provides novel poly-α-olefin compositions having improved stability against deterioration resulting from exposure to ultraviolet light, and particularly it provides novel and useful synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising a solid poly-α-olefin prepared from an α-monoolefinic aliphatic hydrocarbon having 2 to 6 carbon atoms containing .001% to 10% by weight based on said poly-α-olefin of a stabilizer combination comprising an alkylene-bisphenol selected from the group consisting of 2,2'-methylenebis[4-methyl-6-(1-methylcyclohexyl)phenol] and 4,4'-ethylenedioxybis(2-tert.butyl phenol), and a 4-alkoxy-2-hydroxybenzophenone having an alkoxy group of the formula —OR wherein the R is an alkyl radical having 12 to 14 carbon atoms, the weight ratio of said alkylene-bis-phenol to said 4-alkoxy-2-hydroxybenzophenone being in the range of 1/30 to 30/1.

2. A solid poly-α-olefin composition comprising a solid poly-α-olefin selected from the group consisting of polyethylene and polypropylene containing .001% to 10% by weight based on said polypropylene of a stabilizer combination comprising an alkylene-bis-phenol selected from the group consisting of 2,2'-methylenebis[4-methyl-6-(1-methylcyclohexyl)phenol] and 4,4'-ethylenedioxybis(2-tert.butyl phenol), and a 4-alkoxy-2-hydroxybenzophenone selected from the group consisting of 4-dodecyloxy-2-hydroxybenzophenone and 4-tetradecyloxy-2-benzophenone, the weight ratio of said alkylene-bis-phenol to said 4-alkoxy-2-hydroxybenzophenone being in the range of 1/30 to 30/1.

3. A solid polyethylene composition comprising solid polyethylene containing .005% to 5% by weight based on said polyethylene of a stabilizer combination comprising 2,2'-methylenebis[4-methyl-6-(1 - methylcyclohexyl)phenol] and 4-tetradecyloxy-2-hydroxybenzophenone, the weight ratio of said 2,2'-methylenebis[4-methyl-6-(1-methylcyclohexyl)phenol] to said 4-tetradecyloxy-2-hydroxybenzophenone being in the range of 1/10 to 10/1.

4. A solid polyethylene composition comprising solid polyethylene containing .005% to 5% by weight based on said polyethylene of a stabilizer combination comprising 4,4'-ethylenedioxybis(2-tert.butyl phenol) and 4-tetradecyloxy-2-hydroxybenzophenone, the weight ratio of said 4,4'-ethylenedioxy-bis(2-tert.butyl phenol) to said 4-tetradecyloxy-2-hydroxybenzophenone being in the range of 1/10 to 10/1.

5. A solid polyethylene composition comprising solid polyethylene containing .005% to 5% by weight based on said polyethylene of a stabilizer combination comprising 2,2' - methylenebis[4 - methyl - 6 - (1 - methylcyclohexyl)phenol] and 4-dodecyloxy-2-hydroxybenzophenone, the weight ratio of said 2,2'-methylenebis[4-methyl-6-(1-methylcyclohexyl)phenol] to said 4-dodecyloxy-2-hydroxybenzophenone being in the range of 1/10 to 10/1.

6. A solid polyethylene composition comprising solid polyethylene containing .005% to 5% by weight based on said polyethylene of a stabilizer combination comprising 4,4'-ethylenedioxybis(2-tert.butyl phenol) and 4-dodecyloxy-2-hydroxybenzophenone being in the range of 1/10 to 10/1.

7. A solid polypropylene composition comprising solid polypropylene containing .005% to 5% by weight based on said polypropylene of a stabilizer combination comprising 2,2'-methylenebis[4-methyl-6-(1-methylcyclohexyl)phenol] and 4-tetradecyloxy-2-hydroxybenzophenone, the weight ratio of said 2,2'-methylenebis[4-methyl-6-(1-methylcyclohexyl)phenol] to said 4-tetradecyloxy-2-hydroxybenzophenone being in the range of 1/10 to 10/1.

8. A solid polypropylene composition comprising solid polypropylene containing .005% to 5% by weight based on said polypropylene of a stabilizer combination comprising 4,4'-ethylenedioxybis(2-tert.butyl phenol) and 4-tetradecyloxy-2-hydroxybenzophenone, the weight ratio of said 4,4'-ethylenedioxybis(2-tert.butyl phenol) to said 4-tetradecyloxy-2-hydroxybenzophenone being in the range of 1/10 to 10/1.

9. A solid polypropylene composition comprising solid polypropylene containing .005% to 5% by weight based on said polypropylene of a stabilizer combination comprising 2,2'-methylenebis[4-methyl-6-(1-methylcyclohexyl)phenol] and 4-dodecyloxy-2-hydroxybenzophenone, the weight ratio of said 2,2'-methylenebis[4-methyl-6-(1-methylcyclohexyl)phenol] to said 4-dodecyloxy-2-hydroxybenzophenone being in the range of 1/10 to 10/1.

10. A solid polypropylene composition comprising solid polypropylene containing .005% to 5% by weight based on said polypropylene of a stabilizer combination comprising 4,4'-ethylenedioxybis(2-tert.butyl phenol) and 4-dodecyloxy-2-hydroxybenzophenone, the weight ratio of said 4,4'-ethylenedioxybis(2-tert.butyl phenol) to said 4-dodecyloxy-2-hydroxybenzophenone being in the range of range of 1/10 to 10/1.

11. A solid poly-α-olefin composition comprising a poly-α-olefin selected from the group consisting of polyethylene and polypropylene in film form .5 to 100 mils in thickness containing .005 to 5% by weight based on said poly-α-olefin of a stabilizer combination comprising an alkylene-bisphenol selected from the group consisting of 2,2'-methylenebis[4-methyl-6-(1 - methylcyclohexyl)phenol] and 4,4'-ethylenedioxybis(2-tert.butyl phenol), and a 4-alkoxy-2-hydroxybenzophenone selected from the group consisting of 4-dodecyloxy-2-hydroxybenzophenone and 4-tetradecyloxy-2-hydroxybenzophenone, the weight ratio of said alkylene-bis-phenol to said 4-alkoxy-2-hydroxybenzophenone being in the range of 1/10 to 10/1.

References Cited in the file of this patent

UNITED STATES PATENTS

| | | |
|---|---|---|
| 2,820,775 | Chamberlain et al. | Jan. 21, 1958 |
| 2,852,488 | Clark et al. | Sept. 16, 1958 |
| 2,861,053 | Lappin et al. | Nov. 18, 1958 |

FOREIGN PATENTS

| | | |
|---|---|---|
| 785,314 | Great Britain | Oct. 23, 1957 |